June 3, 1969 F. G. BACK 3,447,874
APPARATUS FOR TESTING LENSES AND METHOD
Filed Dec. 20, 1965

INVENTOR.
FRANK G. BACK
BY Albert F. Kronman
ATTORNEY

United States Patent Office 3,447,874
Patented June 3, 1969

3,447,874
APPARATUS FOR TESTING LENSES
AND METHOD
Frank G. Back, 55 Sea Cliff Ave.,
Glen Cove, N.Y. 11579
Filed Dec. 20, 1965, Ser. No. 515,095
Int. Cl. G01b 9/04
U.S. Cl. 356—124    4 Claims

ABSTRACT OF THE DISCLOSURE

A lens testing apparatus for measuring the modulation transfer function of a lens. The apparatus includes a sectored disc rotating at a uniform speed and generating a series of square pulses. Due to the constant time frequency of the disc the square time pulses, which are passed through a low pass filter to block the higher order harmonics, produces a pure sinosoidal time frequency. The spatial frequency to be measured is varied by a variable magnification lens system and the contribution of this system and other parts of the device are compensated for by a number of potentiometers. The pulse beams leaving the disc are focused by the variable magnification lens system and then directed through a lens to be tested. The test lens collimates the light beams and directs them to a plane mirror which returns the light pulses through the test lens. The light is then directed by a beam splitter to a photosensitive cell and the pulse intensity is measured.

---

This invention relates to an apparatus for testing the frequency response of optical devices. The invention has particular reference to an apparatus and a method for testing optical devices which is independent of the personal opinion of the observer, and relies upon precise meter readings.

Where optical systems have been evaluated in the past, they were rated by the number of lines per millimeter which could be resolved. However, accuracy could not be obtained since some observers are able to detect more lines being resolved than others. In addition, the resolving power of an optical system is by no means a criterion of its capability to produce an accurate image of an object. As a result, the concept of modulation transfer has been introduced into the method of evaluating optical systems.

Presently known apparatus for measuring modulation transfer employs different targets which are placed in sequence into the focal plane. Others generate a moire pattern which is used as a target, the purpose being to provide a target of variable spatial frequency to determine the modulation transfer for each spatial frequency. Moving picture film strips with a variable density track showing frequencies corresponding to a different number of lines per millimeter have been employed. Such films, which can consist of an endless loop, present certain shortcomings such as film grain, modulation deficiency, etc. In addition, the film runs at a constant speed, with the result that the spatial frequency is identical to the time frequency. The amplifier behind the photocell in such devices has to have an extremely flat characteristic in order to give accurate readings on the output meter measuring the modulation transfer.

With prior art devices, the lenses of different mechanical dimensions required different collimators, so that different instruments were needed for measuring different lens sizes. Generally speaking, a collimator should have at least five times the focal length of the lens to be tested. A collimator should also have at least the diameter of the entrance pupil of the lens under test. Therefore, if a movie lens of one inch, $f/1.6$, is to be tested, the testing instrument should have a collimator with a diameter of ¾ inch, and a focal length of five inches. If a lens with a forty inch length, $f/8$, is to be tested, an instrument having a collimator of 5 inch diameter, with a focal length of 200 inches, is required. Off-axis measurements are extremely complicated to achieve with prior art devices, because of the necessity to tilt the lens under test around its nodal point, which point must be accurately determined in advance.

The present invention eliminates the uncertainty and difficulties of prior art devices. A moving test target is generated by the apparatus, and this target is arbitrarily assigned a value of 100% contrast. The target is viewed through the apparatus and the lens under test and, in so doing, contrast is lost. It is immaterial whether this contrast is lost by diffusion or by a resolution loss resulting from the faulty characteristics of the lens system under test. Whatever the reason for this loss of contrast, what remains is a percentage of the contrast of the primary target. If different resolution patterns are measured by the system, different percentages of contrast result. The percentages are then plotted on a graph which shows the percentage of contrast as a function of the number of lines per millimeter. The locus of these percentages provides an excellent indication of the image quality produced by the lens under test.

An object of the present invention is to provide a lens testing apparatus which contains an equivalent of a perfect lens having a 100% modulation transfer.

Another object of the present invention is to provide a lens testing apparatus which provides a variable spatial frequency while maintaining fixed time frequency for an amplifier.

Still another object of the present invention is to provide a lens testing apparatus which is free of the difficulties imposed by grain in the target.

Another object of the present invention is to provide a lens testing device which requires no collimator and is therefore not limited by the physical size of the lens to be tested.

Another object of the present invention is to test lenses by the measurement of a series of modulation transfer functions at different settings without the influence of human judgment and error.

Still another object of the present invention is to reduce the time required for testing lens systems and to increase the accuracy of such measurements.

A feature of the present invention is its use of a simple electrical compensator to correct aberrations and deviations in the optical part of the measuring instrument itself.

Still another feature of the present invention is its simple means for measuring modulation both on-axis and off-axis.

A further feature of the present invention is the use of the lens system under test as an autocollimator.

A feature of the present invention includes the use of a coupling between the variable magnification lens system and a plurality of potentiometers connected to the amplifier for adjusting the gain of the amplifier at each setting of the variable magnification lens system.

The invention comprises an apparatus for testing modulation transfer in optical systems and includes a light source, a target wheel moving at a constant speed for modulating the light and a variable magnification lens system for receiving the modulated light from the target wheel and focusing it in a first image plane. A beam splitter is mounted in the path of the modulated light coming from the lens under test. The lens under test is placed at a distance from the image plane so that the focal plane of the lens coincides with the first image plane of the variable magnification lens. A plane mirror is placed in front of the lens under test to reflect the collimated beam back through said lens and to focus the modulated beam at the first image plane. A portion of the light from the lens under test is reflected by the beam splitter and is focused by a microscope system mounted at an angle to the axis of the variable magnification lens system on an optical slit. A photo-electric cell is mounted behind the slit to receive the modulated beam. These light modulations are thus transformed into electrical pulses. The amplitude of the pulse train is then measured by an A.C. meter.

In the accompanying drawing, forming a part hereof, there is illustrated one embodiment of the invention, in which drawing similar reference characters designate corresponding parts and in which.

Figure 1:
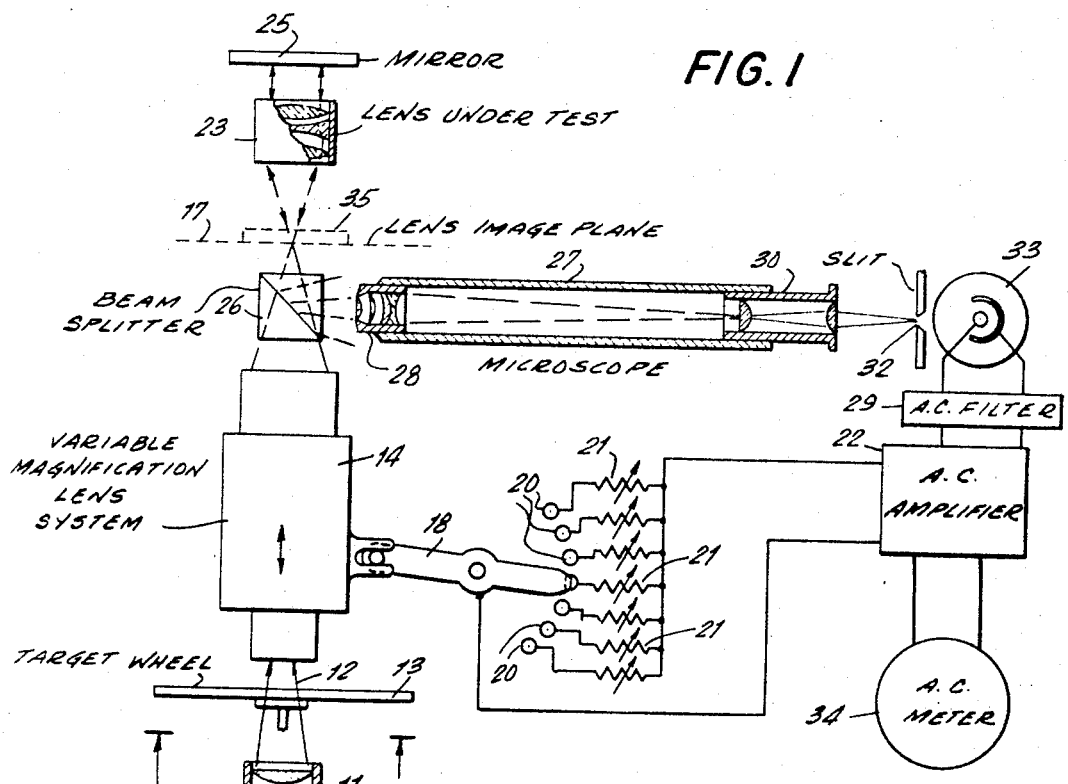
FIGURE 1 is a somewhat diagrammatic plan view of the apparatus with certain parts shown in section, and certain circuits in block form.
Figure 2:
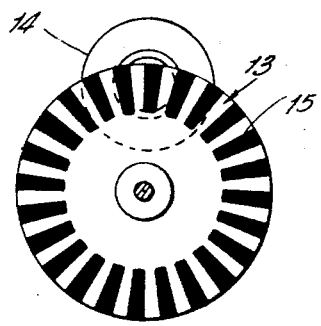
FIGURE 2 is a cross-sectional view taken on line 2—2 of FIGURE 1, looking in the direction of the arrows.

Referring now to the drawing, and particularly FIGURE 1, 10 indicates a light source positioned in front of a condensing lens 11. The light beam 12 coming from the light source 10 is intersected by a target disc 13 (see FIGURE 2). The target disc is in the form of a transparent wheel, upon which there has been imposed a line target 15. After passing through the disc 13 the light enters the variable magnification lens system 14. The variable magnification lens system is mechanically operated to change its magnification. The variable magnification lens system 14 is coupled by a lever arm 18 to a plurality of contacts 20 which are in turn connected to a plurality of adjusting potentiometers 21. The potentiometers 21 are connected to an AC amplifier 22 so as to adjust the gain of the amplifier. The reason for this adjustment in gain will be discussed later when the operation of the apparatus is more fully set forth.

A lens to be tested 23 is placed in the device to receive the light coming from the variable magnification lens system 14 in such a way that the image plane of the variable magnification lens system and the focal plane of the lens to be tested coincide. The lens 23 produces a collimated beam which is reflected by a plane mirror 25. The collimated beam is thus reversed in its direction and is sent back through the lens 23 to be focused again at its focal plane. The lens to be tested 23 therefore serves as an autocollimator.

A beam splitter 26 is interposed in the system between the end of the variable magnification lens system 14 and the constant image plane 17. A microscope 27 having an objective 28 and an eyepiece 30 views this reflected image through the beam splitter 26 and projects a real enlarged image on the slit 32.

The light passing through the slit 32 is picked up by a photo-electric cell 33. The cell 33 is connected to the input circuit of the amplifier 22 and the output circuit is connected to an AC meter 34. The AC amplifier has to amplify only one frequency and the AC meter records only the amplified output of the significant input frequency. In one embodiment of the invention, a frequency of 800 cycles per second is employed and a low pass filter 29 was included in the amplifier 22 to suppress all frequencies above 800. As noted before, the adjusting potentiometers 21, each of which corresponds to one of the magnifications of the variable magnification lens system, changes the gain of the amplifier when the lever arm 18 is shifted to a different position.

The operation of this circuit is as follows:

A mirror 35 (shown in dotted lines in FIGURE 1) is placed with its front reflecting surface coinciding with the image plane 17. This mirror reflects all the light from the variable magnification lens system 14 back to the beam splitter 26, which reflects a portion of its incident light through the microscope 27 to the slit 32 and the photo-electric cell 33. The potentiometers 21 are next adjusted so that the meter reads 100% for each position of magnification.

The lens to be tested 23 is now placed into position and the light which is received from the mirror 25 and the lens 23 passes through the microscope 27, slit 32, and the measuring system 33, 22, and 34. The variable magnification lens system 14 is moved in sequence to all its positions and the meter reading for each position is noted. This set of readings comprises the lens test.

When the variable magnification lens system 14 is set at its maximum degree of magnification, the equivalent number of lines per millimeter is small since the lines and the spaces between the lines are large. When the magnification is reduced, there are many more lines in the image plane and therefore the number of lines per millimeter is at a maximum.

In FIGURE 1, the lens to be tested 23 is shown in axial alignment, however the lens 23 may be shifted so as to test the off-axis performance of the lens. When the lens 23 is shifted, the mirror 25 must be tilted to redirect the light back through the lens 23, the beam splitter, and the microscope and the slit 32.

Figure 3:
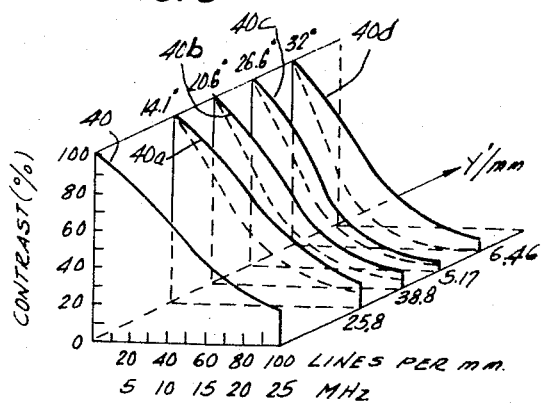
FIGURE 3 is a graph showing how the test results are tabulated.

In one of the embodiments of the invention, the speed of the target disc 13 and the spatial frequency of the lines 15 were arranged so that the effective number of lines per millimeter could be varied from a minimum of 15 to a maximum of 100. The results plotted for one type of lens under test are shown in FIGURE 3. Curve 40 is the on-axis curve. Curves 40a, 40b, 40c and 40d, represent th readings off-axis. The dotted lines indicate sagittal contrast modulation transfer and the solid lines represent tangential contrast modulation transfer.

From the foregoing, it will be seen that there has been provided a simplified apparatus for testing the frequency response of optical devices, which is free of many limitations inherent in prior art devices and which lends itself to rapid, highly accurate use.

Having thus fully described the invention, what is claimed as new and desired to be secured by Letters Patent of the United States, is:

1. Apparatus for testing the frequency response of optical devices comprising, a light source, a target disc containing alternate opaque and transparent areas moving at constant speed for modulating the light from said light source, a variable magnification system having a constant image plane position for receiving the modulated light from the target disc and focussing it in said image plane, a beam splitter mounted in the path of the modulated light from the variable magnification lens system, a lens to be tested mounted in front of the variable magnification system and with its principal plane spaced from the said image plane a distance equal to the focal length of the lens to be tested for producing a collimated beam at its exit face, a plane mirror in front of the lens to be tested for reflecting the collimated light beam back through the lens to be tested whereby said lens acts as an autocollimator, a microscope mounted at an angle to the axis of the variable magnification lens system for receiving the modulated light from the beam splitter and for refocusing it in a second image plane, an optical slit positioned in said second image plane for passing a portion of the modulated beam, a photosensitive measuring system mounted adjacent to the slit for receiving the modulated beam and transforming the light modulations into electrical pulses, measuring means for indicating the amplitude of the pulse train, and a mechanical coupling means connected between the variable magnification lens system and a plurality of variable resistors for varying the photosensitive measuring system to compensate for variations in the measuring device at each magnification, whereby only the defects of the lens under test affect the measurements.

2. Apparatus as claimed in claim 1 wherein said photosensitive system includes a low pass filter which suppresses all higher harmonics above the modulation frequency, whereby a pure sine wave is produced.

3. The method of testing the frequency response of an optical device which comprises the steps of directing a beam of light fully modulated by a rotating target wheel through a variable magnification lens system having a constant image plane position to change the spatial frequency of the target presented to the lens under test, reflecting the light from the variable magnification lens system by reflecting means through an optical slit into a photosensitive measuring system, adjusting the measuring system to a desired reading corresponding to an optical device having 100% modulation transfer by adjusting the system to 100% modulation transfer reading for each setting of the variable magnification system, replacing the reflecting means with an optical device to be tested, directing the light from the variable magnification lens system through the optical device to be tested, reflecting the light so transmitted back through the optical device to be tested whereby said device serves as an autocollimator, and receiving the autocollimated light in the photosensitive measuring system whereby a reading showing the difference between the optical system to be tested and an optical device having 100% modulation transfer may be observed for each setting of the variable magnification lens system.

4. The method according to claim 3 wherein the step of reflecting the light back through the optical device to be tested includes dividing the beam by a beam splitter and then directing the divided portion through a microscope to the optical slit.

References Cited

UNITED STATES PATENTS 2,164,576    7/1939    Collins _____ 88—56

FOREIGN PATENTS 1,321,133    2/1963    France.
1,307,347    9/1962    France.

OTHER REFERENCES

Herriott, D. R. Recording Electronic Lens Bench, Journal of The Optical Soc. of America, vol. 48, No. 12, December 1958. pp. 968–971.

Bryngdahl, Wavefront Shearing Interferometer for Direct Recording of the Refractive Index Gradient in Cartesian Coordinates, Jour. of Opt. Soc. of Am. vol. 53, No. 5, May 1963, pp. 571—576.

RONALD L. WILBERT, *Primary Examiner.*

T. MAJOR, *Assistant Examiner.*